March 25, 1958  M. DESSAUX  2,828,099
AUTOMATIC WEIGHING AND DISTRIBUTING MACHINES FOR
DOUGH AND LIKE PLASTIC SUBSTANCES
Filed June 23, 1955  4 Sheets-Sheet 1
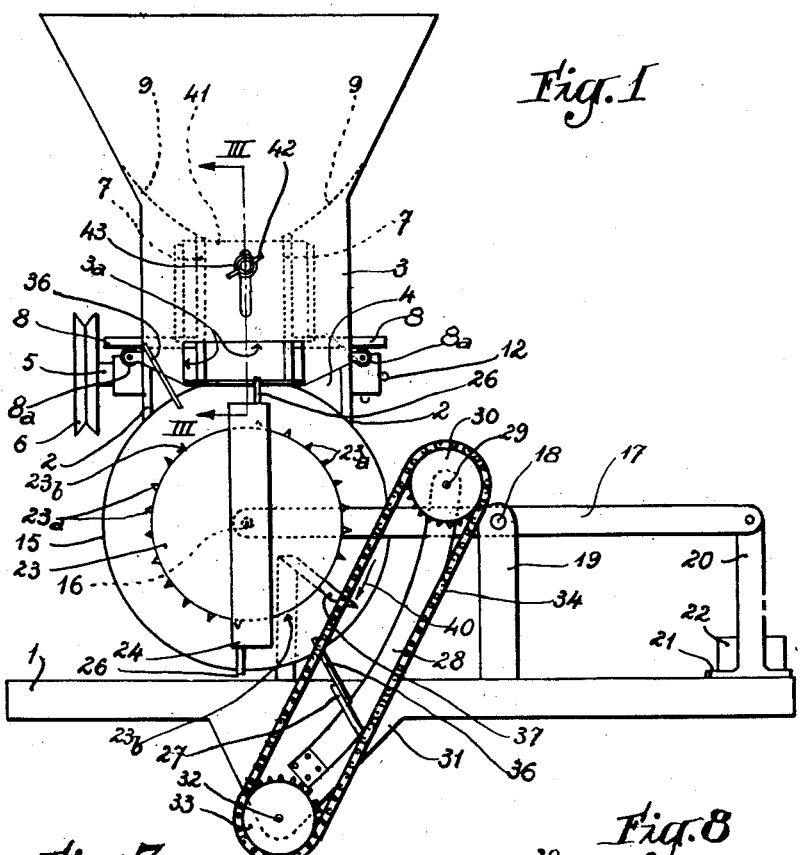
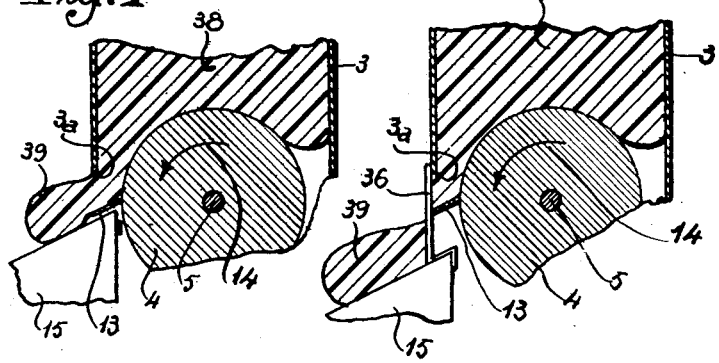
INVENTOR.
Marcel Dessaux
BY
ATTORNEYS March 25, 1958    M. DESSAUX    2,828,099
AUTOMATIC WEIGHING AND DISTRIBUTING MACHINES FOR
DOUGH AND LIKE PLASTIC SUBSTANCES
Filed June 23, 1955    4 Sheets-Sheet 2
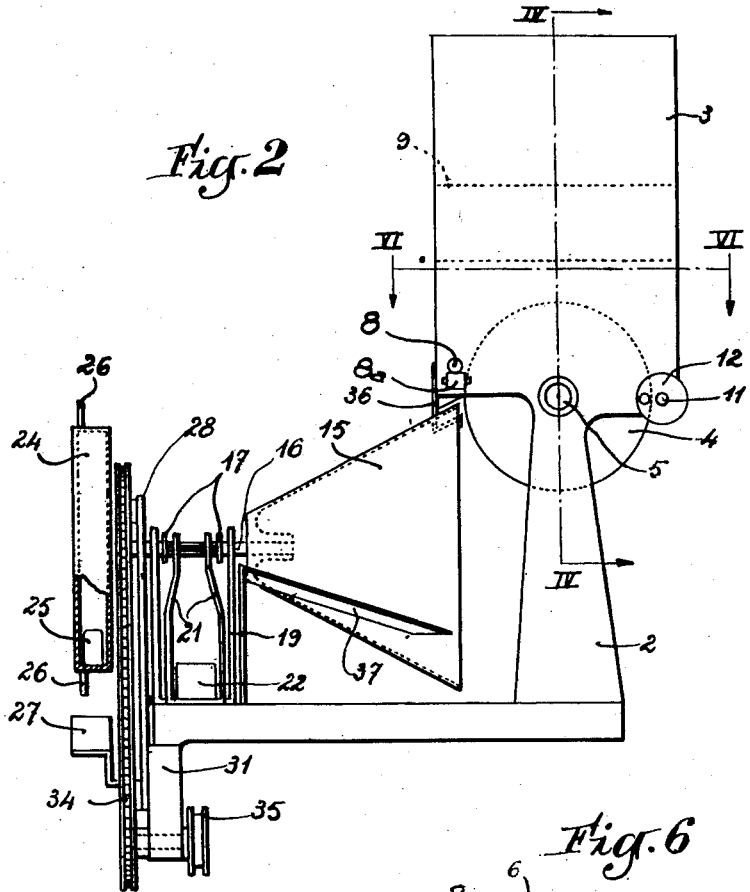
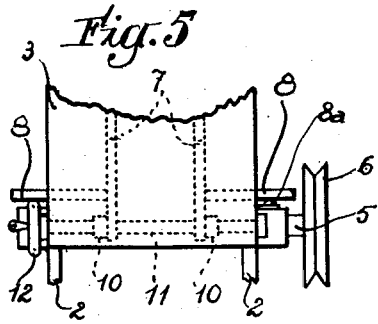
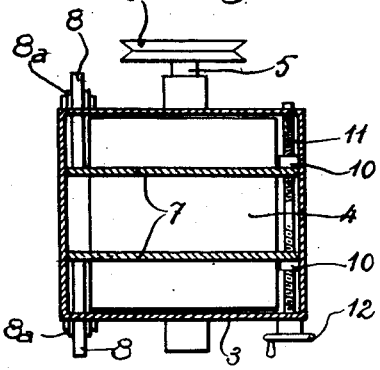

March 25, 1958  M. DESSAUX  2,828,099
AUTOMATIC WEIGHING AND DISTRIBUTING MACHINES FOR
DOUGH AND LIKE PLASTIC SUBSTANCES
Filed June 23, 1955  4 Sheets-Sheet 3

INVENTOR.
Marcel Dessaux
BY
Alexander Dowell
ATTORNEYS

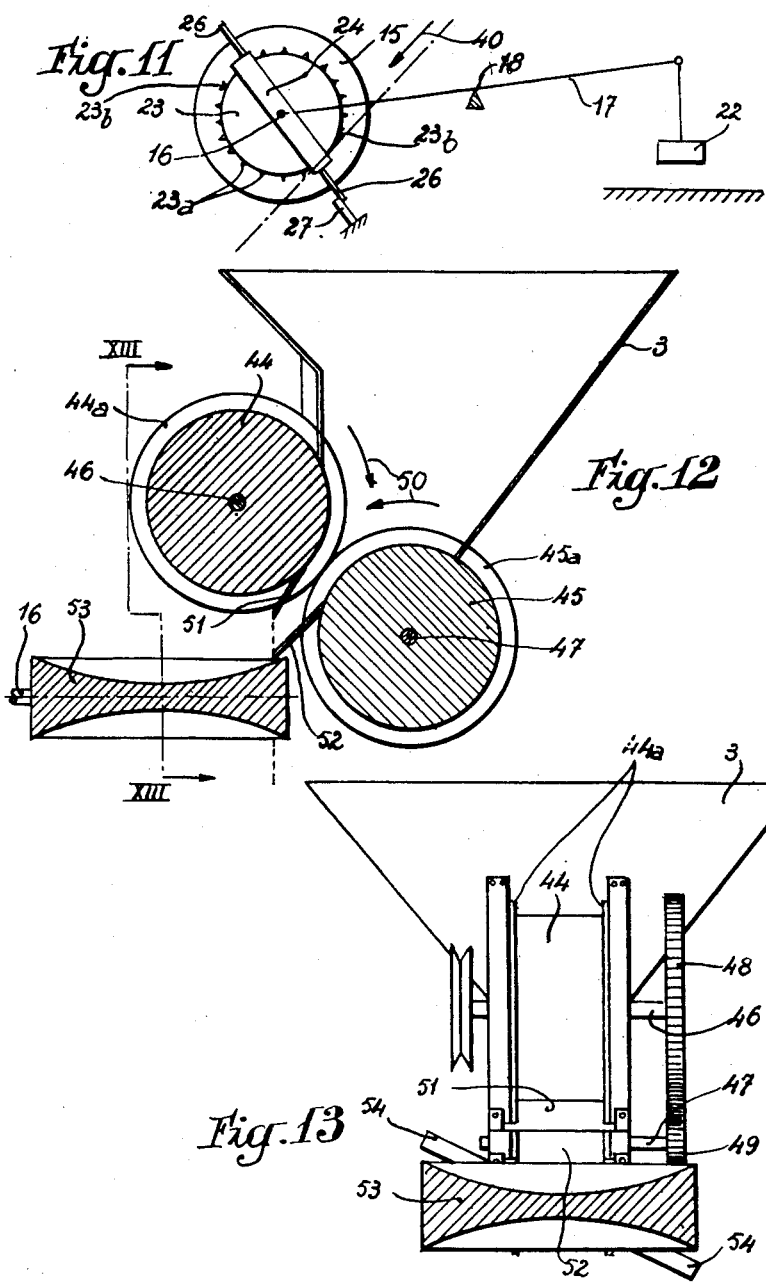

United States Patent Office 2,828,099
Patented Mar. 25, 1958

2,828,099

AUTOMATIC WEIGHING AND DISTRIBUTING MACHINES FOR DOUGH AND LIKE PLASTIC SUBSTANCES

Marcel Dessaux, Sanvignes-les-Mines, France

Application June 23, 1955, Serial No. 517,567

Claims priority, application France July 1, 1954

10 Claims. (Cl. 249—5)

My invention relates to a machine adapted to distribute a plastic substance, and more particularly dough, into lumps of determined weight.

In the bread making industry the dough is first divided into lumps corresponding to the loaves to be finally obtained. This division may be performed by equal volumes, but the weight of the loaf obtained then depends on the density of the dough which is irregular since it is highly influenced by the quantity of carbon dioxide actually retained. Moreover a volumetric division entails some compression of the dough and it is a known fact that such a compression has a detrimental effect on the qualities of bread. The division of the dough into lumps of equal weight requires automatic weighers of intricate and expensive construction.

A first object of my invention is to provide an automatic weighing and distributing machine for dough and like substances, of simple and sturdy construction, adapted to produce lumps of substantially equal weight which are automatically discharged from the machine.

A further object of my invention is to provide an automatic weighing and dividing machine for dough and like substances wherein the dough is not compressed in a noticeable manner from the inlet to the outlet of the machine.

Still a further object of my invention is an automatic weighing and distributing machine for dough and like substances wherein there is continuously produced a strip of dough, the said strip being fed onto a rotatable receiver member carried by a weighing device. When the weight of the length of the strip supported by the receiver reaches a given limit, the receiver moves downwardly and it comes into engagement with a driving member which rotates the said receiver through about one-half turn to discharge the lump of dough from the latter, this lump being simultaneously separated from the continuously advancing strip. The receiver is thereafter returned to its receiving position.

The strip of dough may be produced by one or two rollers continuously rotating in the bottom part of a hopper or the like provided with an appropriate opening for the outlet of the strip. Means may be provided for adjustment of the width and thickness of the strip. The receiver member may be in the form of an invertible plate or of a cone or like body of revolution having a substantially horizontal axis. Rotation of this member may be effected by a pinion carried by the spindle of the said member and engaging a continously moving chain, the latter being so disposed that the driving reaction tends to lower the pinion which is thus maintained in engagement with the chain. Stoppage of the rotation is then preferably obtained by providing blank spaces on periphery of the pinion, abutments limiting free rotation of the receiver.

The strip emerging from the hopper may be cut by cutters associated to the receiver to come into operation during rotation of the latter.

There is preferably also associated to the receiver a counterweigh movable along guides transversely carried by the receiver spindle, in such a manner that the receiver is always returned to any one of two opposed positions when it is disengaged from its driving member.

In the annexed drawings:

Fig. 1 is a front view of a machine according to my invention.

Fig. 2 is a side view thereof.

Figure 3:
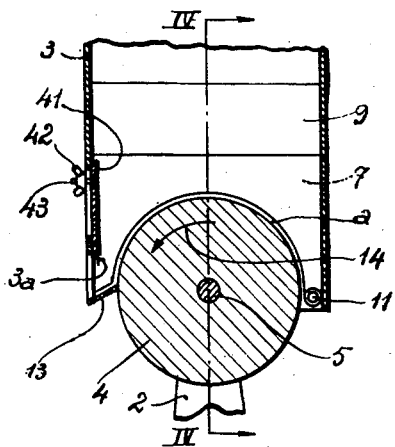
Figure 4:
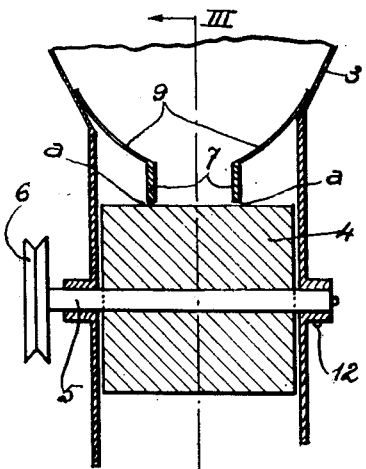

Figs. 3 and 4 are partial sections taken through lines III—III (Figs. 1 and 4) and IV—IV (Figs. 2 and 3).

Fig. 5 is a fragmental rear view showing the lower part of the hopper.

Fig. 6 is a horizontal section taken along line IV—IV of Fig. 2.

Figs. 7 and 8 are diagrammatical sections illustrating the operation of the strip forming means of the machine.

Figure 9:
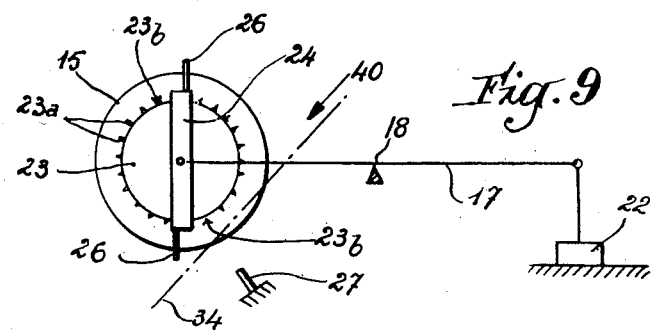
Figure 10:
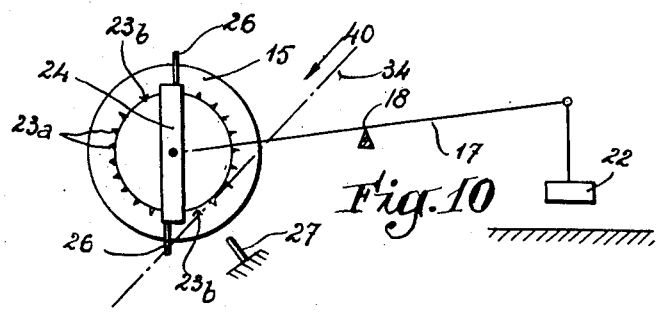

Figs. 9 to 11 are diagrams illustrating the general operation of the receiver member and of the weighing device at three successive positions during an operating cycle.

Fig. 12 is a fragmental longitudinal vertical section of a modified construction.

Fig. 13 is the corresponding front view thereof.

The machine illustrated in Figs. 1 and 2 comprises a base 1 which carries a support 2 on which is mounted a hopper 3 having two transverse vertical sides as shown in Fig. 2 and two upper longitudinal oblique sides extending downwardly in the form of lower vertical sides, as shown in Fig. 1. Hopper 3 is provided with a lower rectangular outlet 3a (Fig. 1) disposed in one of the transverse vertical sides. A roller 4 rotates in the lower part of hopper 3, this roller being mounted on a transverse horizontal shaft 5 (Fig. 6) and having a length substantially equal to the width of the said lower part. Shaft 5 carries an appropriate driving pulley 6 by means of which it is connected with a motor, not illustrated, to be rotated at a relatively low speed. Two longitudinal cheeks 7, for instance made of sheet iron, are also disposed within the lower part of hopper 3, such cheeks being appropriately cut to provide a passage for roller 4. Each cheek 7 is secured at the end of a horizontal transverse guiding rod 8 which is passed through the wall of hopper 3 and is supported by a roller 8a rotatably carried by the said wall on the outer side thereof. The upper edge of each cheek 7 is provided with an elastic blade 9 (Figs. 1 and 4) which applies against the corresponding oblique side of hopper 3 substantially along the whole width of this side. Each cheek 7 also carries a nut 10 and the two nuts 10, which are of equal but opposed screw-pitch, are mounted on the same transverse rod 11 (Fig. 6) which is correspondingly screw-threaded as shown. Rod 11 is rotatably supported by the longitudinal walls of hopper 3 and it is provided with an outer actuating hand wheel 12. As clearly shown in Figs. 2 and 6 rods 8 and rod 11 are disposed on each side of shaft 5 whereby each cheek 7 is supported at both ends.

It will be appreciated that the dough loaded into hopper 3 flows by gravity between the walls or sides thereof and is guided by blades 9 (Fig. 4) to come into contact with roller 4 in the portion thereof situated between cheeks 7. The latter fit with limited play on the periphery of the said roller whereby the dough cannot leak transversely. The width of the space thus determined by cheeks 7 may be adjusted at will by means of hand wheel 12, blades 9 sliding resiliently on the oblique sides of hopper 3.

A scraper blade 13 (Fig. 3) is disposed between the lower edge of outlet 3a and the periphery of roller 4 in such a manner that when the said roller rotates in the appropriate direction (indicated by arrow 14 in Fig. 3), the dough frictionally displaced by roller 4 is separated therefrom by scraper 13 and is guided by the latter towards outlet 3a. Scraper 13 besides prevents the dough from falling through the space left between roller 4 and the front side of hopper 3. As to the space between roller 4 and the rear side of hopper 3, it is substantially closed by rod 11 and the movement of roller 4 tends to return upwardly the dough which may fall down into this space.

Immediately below outlet 3 there is disposed a conical receiver 15 carried by a horizontal spindle 16. As illustrated in Fig. 2 the base or larger end of receiver 15 is situated beneath hopper 3 immediately at the rear of the vertical plane of the front face thereof comprising outlet 3a. Spindle 16 is rotatably carried by one end of a weighing beam 17 pivotally supported by a pivot 18 carried by a bifurcated support 19 fixed onto base 1. The other end of beam 17 pivotally carries arms 20 which support a plate 21 normally maintained in contact with base 1 by a weight 22. Spindle 16 protrudes in front of beam 17 and it carries a wheel 23 and a transverse tube 24. Wheel 23 is provided with teeth 23a but there are left along its periphery two opposed zones 23b void of any tooth. Tube 24 is fixed on the extreme end of spindle 16, it is closed at both ends and it contains a weight 25 which is freely slidable therein. It will be appreciated that this weight 25 automatically slides towards the lower end of tube 24 and tends to bring same to the vertical position. In other words when spindle 16 and the parts associated therewith are free, they automatically return to one of two opposed positions.

Tube 24 carries at both ends a radial finger 26 and base 1 is provided with an abutment 27 (Fig. 1) which may cooperate with fingers 26 when the end of beam 17 carrying spindle 16 has been lowered (position shown in Figs. 10 and 11) thus stopping rotation of spindle 16, but which is ineffective when such is not the case (position of Fig. 9, spindle 16 then being freely rotatable together with the parts associated therewith.

Base 1 also carries an arm 28 (Fig. 1) which supports a horizontal shaft 29 parallel to spindle 16 the said shaft carrying a chain wheel 30. There is besides provided below base 1 a lug 31 which rotatably supports a shaft 32, also parallel to spindle 16 and on which there is keyed another chain wheel 33. Wheels 30 and 33 support an endless chain 34 which is disposed obliquely, as shown in Fig. 1 in such a manner as to pass close to wheel 23, slightly on the side and below the latter, without however engaging teeth 23a when beam 17 is at its position of rest of Figs. 1 and 9. Shaft 32 is provided with a driving pulley 35 (Fig. 2) by means of which it is continuously rotated in such a direction that the portion of chain 34 which passes close to wheel 23 moves downwardly.

The conical receiver 15 carries on its larger base two opposed cutter blades 36 which are disposed at an angle of about 30° with respect to the direction of tube 24. Blades 36 are Z-shaped in an axial plane, as indicated in Fig. 2, and they are so arranged as to slide along the edges of outlet 3a when the conical receiver is rotated at the lowermost position of beam 17 (position of Figs. 10 and 11).

Base 1 supports a fixed scraper blade 37 so disposed as to scrape the periphery of receiver 15 in the lower half thereof at the lowermost position of beam 17.

The machine described operates as follows:

Supposing that the pasty substance to be distributed in measured quantities is dough, the latter is fed into hopper 3 wherein it forms a mass 38 (Figs. 7 and 8) which is finally supported by roller 4. The latter rotating in the direction indicated by arrow 14 the dough is frictionally driven towards scraper 13 by which it is detached from roller 4 in the form of a continuous strip 39 which passes through outlet 3a, reaches receiver 15 and runs thereon. The diagram of Fig. 9 corresponds to the moment when the strip (not illustrated) reaches the conical receiver.

When a determined weight of dough is thus supported by receiver 15, the right hand branch of beam 17 sinks, weight 22 being raised (position of Fig. 10). Wheel 23 is lowered and its teeth 23a engage chain 34 which runs downwardly in the direction indicated by arrow 40, whereby the said wheel is caused to rotate together with spindle 16, receiver 15 and tube 24. The reaction resulting from this drive is of course directed substantially in the direction of arrow 40 and it therefore comprises a component which tends to lower the right hand branch of beam 17, i. e. to maintain wheel 23 in engagement with chain 34. The angular movement of beam 17 is limited by the periphery of wheel 23 which abuts against chain 34, or there may be provided some other kind of positive abutment, as it will be easily appreciated.

Wheel 23 is thus rotated by chain 34 until the latter meets one of the zones 23b void of teeth on the periphery of the said wheel. The arrangement is such that this angle of rotation of wheel 23 is somewhat lower than 180°. In the example illustrated this angle is of about 150°. Fig. 11 shows the position of the parts when wheel 23 becomes disengaged from chain 34 owing to the absence of teeth on its periphery. Due to inertia effects the rotatable unit formed by spindle 16, wheel 23 and receiver 15 tends to rotate further, but it is immediately stopped by one of fingers 26 abutting against abutment 27 before chain 24 may engage the next teeth 23a on the periphery of wheel 23. It will be appreciated that the slidable weight 25 is now at the lower end of tube 24 and therefore tends to maintain finger 26 against abutment 27.

Now during the rotation of receiver 15 through about 150° the strip of dough 39 (Fig. 7) supported by the said receiver has been pulled and it has been separated from the mass 38 within hopper 3 by one of cutter blades 36 (the one situated immediately on the left of outlet 3a in Fig. 1), as indicated in Fig. 8. The strip portion thus separated has rotated with receiver 15 and it has been detached therefrom by scraper blade 37 to fall into an appropriate receiving apparatus, not illustrated, through an opening provided in the central part of base 1.

As soon as the strip portion is detached from receiver 15 beam 17 tends to return to the position of Fig. 9. Spindle 16 is therefore raised together with tube 24 and fingers 26. The lower finger 26 is thus disengaged from abutment 27 whereby the rotatable unit is free to return to the position illustrated in Figs. 1, 2 and 9 under the action of the slidable weight 25.

The operative rotational movement of receiver 15 should be relatively rapid in such a manner that the said receiver may resume its normal position of Figs 1 and 2 without being hindered by the dough strip which emerges from outlet 3a.

The output of the machine may be varied by adjusting cheeks 7 to vary the width of the strip issuing from outlet 3a.

In the modification of Figs. 12 and 13 the dough strip is formed by two rollers 44 and 45 carried by transverse shafts 46 and 47 under hopper 3, the axes of these shafts being situated in an oblique plane rising in front of hopper 3, as shown. Shafts 46 and 47 are connected by a pair of gears 48 and 49 and they are rotated in the direction indicated by arrows 50. The dough which adheres to the periphery of rollers 44 and 45 is detached therefrom by two parallel scraper blades, respectively 51 and 52 which form a guide for the strip between the rollers and the receiver. The latter is in the form of a double plate 53 with dished receiving faces. These faces may be covered with fabric or they may be impregnated with an appropriate agent adapted to prevent the dough from sticking (neutral oil, silicone varnish, flour, &c.). Plate 53 is carried by spindle 16 as in the embodiment of Figs. 1 and 2 and it is provided with a double cutter blade adapted to cut the dough strip as it issues from guide 51—52 (this cutter blade has not been illustrated in Fig. 12, but its profile has been indicated in broken lines). The machine of Figs. 12 and 13 of course operates as above explained with reference to Figs. 9 to 11.

Rollers 44 and 45 may be provided with lateral cheeks, as indicated at 44a and 45a, the front and rear wall of hopper 3 being cut correspondingly.

I claim:

1. An automatic weighing and distributing machine for dough and like plastic substances comprising means to form a continuous strip of the substance to be distributed; a receiver member rotatable about a substantially horizontal axis and adapted to receive said strip; a weighing device to support said rotatable receiver member, said weighing device being adapted to be actuated by the weight of the portion of said strip which rests on said receiver member and to lower same from a highermost position to a lowermost position; a pinion coaxially carried by said receiver member and rotating therewith; a driving member continuously moving below said pinion to engage and to drive same when said weighing device has been actuated to rotate said receiver member and to discharge therefrom the portion of said strip supported thereby; means to separate the portion of said strip supported by said receiver member from said strip forming means each time said receiver member is rotated; means to cause disengagement of said pinion from said driving member when said receiver member has rotated through a determined angle; and means to return said receiver member to its strip receiving position when said weighing device has itself returned to its unloaded position corresponding to the highermost position of said receiver member.

2. In a machine as claimed in claim 1, said driving member being in the form of a chain running obliquely and downwardly to be engaged by said pinion when said receiver member is lowered by said weighing device under the action of the weight of the strip portion supported by said receiver.

3. In a machine as claimed in claim 1, said pinion having on its periphery blank zones void of teeth to become disengaged from said driving member after a determined angle of rotation; and abutment means to stop free rotation of said receiver member after disengagement of said pinion from said driving member, said abutment means becoming ineffective when said receiver member is returned to its highermost position.

4. In a machine as claimed in claim 1, a tubular guide transversely disposed with respect to said receiver member and adapted to rotate therewith; and a weight slidable within said tubular guide to always tend to return said receiver member to a position at which said tubular guide is vertical; and the angle of rotation of said receiver member under the action of said driving member being comprised between 90° and 180°

5. An automatic weighing and distributing machine for dough and like plastic substances comprising means to form a continuous strip of the substance to be distributed; a receiver member rotatable about a substantially horizontal axis and adapted to receive said strip; a weighing device to support said rotatable receiver member, said weighing device being adapted to be actuated by the weight of the portion of said strip which rests on said receiver member and to lower same from a highermost position to a lowermost position; a tubular guide transversely disposed with respect to said receiver member and adapted to rotate therewith; a weight slidable within said tubular guide to always tend to return said receiver member to a position at which said tubular guide is vertical; a pinion coaxially carried by said receiver member and rotating therewith, said pinion having on its periphery two opposed blank zones void of teeth; a driving member continuously moving below said pinion to engage and to drive same when said weighing device has been actuated to rotate said receiver member and to discharge therefrom the portion of said strip supported thereby, said driving member being so disposed with respect to said pinion that they become disengaged from each other by one of said blank zones of the periphery of said pinion after an angle of rotation comprised between 90° and 180°; two opposed substantially radial fingers adapted to rotate with said receiver member and said pinion; and a fixed abutment cooperating with one of said fingers to stop free rotation of said receiver member immediately as said pinion has been disengaged from said driving member by one of said blank zones, said fixed abutment being so disposed that it becomes ineffective when said receiver member is returned to its highermost position.

6. An automatic weighing and distributing machine for dough and like plastic substances comprising means to form a continuous strip of the substance to be distributed; a receiver member adapted to receive said strip, said receiver member being rotatable about a substantially horizontal axis; a weighing device to rotatably support said receiver member, said weighing device being adapted to be actuated by the weight of the portion of said strip which rests on said member; driving means to positively rotate said receiver member through a determined angle each time said weighing device has been actuated, to discharge from said receiver member the portion of said strip supported thereby; cutter blades carried by said receiver member to separate the portion of said strip supported by said receiver member from said strip forming means whenever said receiver member is rotated; and means to return said receiver member to its strip receiving position after said strip portion has been discharged from said receiver plate.

7. An automatic weighing and distributing machine for dough and like plastic substances comprising a hopper adapted to receive the plastic substance to be distributed, said hopper having a lateral outlet; a roller rotating about a substantially horizontal axis within said hopper to support the mass of plastic substance therein and to frictionally drive said substance towards said outlet; a pair of lateral cheeks extending substantially along the upper half of the periphery of said roller to limit the portion of said roller which supports said mass of plastic substance; means to adjust the distance apart of said cheeks; means to form a slidable partition between the upper edge of each of said cheeks and the next lateral wall of said hopper to prevent said substance from flowing between each cheek and the next lateral wall of said hopper; a scraper blade cooperating with the periphery of said roller below said cheeks to detach from said periphery the strip of substance adhering thereto and to guide same to said outlet; and means to cut the strip issuing from said outlet into lumps of substantially equal weight.

8. An automatic weighing and distributing machine for dough and like plastic substances comprising means to form a continuous strip of the substance to be distributed; a receiver member adapted to receive said strip, said receiver member being in the form of a cone with a substantially horizontal axis; a weighing device to rotatably support said cone, said weighing device being adapted to be actuated by the weight of the portion of said strip which rests on said cone; driving means to positively rotate said receiver member through a determined angle each time said weighing device has been actuated to discharge from said cone the portion of said strip supported thereby; a fixed scraper member to detach said portion from said cone during rotation thereof; and means to separate the portion of said strip supported by said cone from said strip forming means whenever said cone is rotated.

9. In a machine as claimed in claim 8, said means to separate the portion of said strip supported by said cone from said strip forming means being in the form of cutter blades carried by said cone.

10. An automatic weighing and distributing machine for dough and like plastic substances comprising means to form a continuous strip of the substance to be distributed; a receiver member to receive said strip, said receiver member being rotatable about a substantially horizontal axis; a weighing device to rotatably support said receiver member, said weighing device being adapted to be actuated by the weight of the portion of said strip which rests on said receiver member; driving means adapted to be brought into engagement with said receiver member by said weighing device whenever same has been actuated, and to positively rotate said receiver member through a predetermined angle; means actuated by rotation of said receiver member to separate the portion of said strip supported by said receiver member from said strip forming means; and scraper means to detach from said receiver member during rotation thereof the portion of said strip supported thereby.

References Cited in the file of this patent

UNITED STATES PATENTS 2,538,346     Wood              Jan. 16, 1951

FOREIGN PATENTS 362,917     Great Britain         Dec. 9, 1931